US010892954B2

(12) United States Patent
Manzalini

(10) Patent No.: US 10,892,954 B2
(45) Date of Patent: Jan. 12, 2021

(54) SYSTEM FOR MANAGING SERVICES IN SOFTWARE DEFINED INFRASTRUCTURES

(71) Applicant: TELECOM ITALIA S.p.A., Milan (IT)

(72) Inventor: Antonio Manzalini, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 0 days.

(21) Appl. No.: 16/621,327

(22) PCT Filed: Jun. 22, 2018

(86) PCT No.: PCT/EP2018/066783
§ 371 (c)(1),
(2) Date: Dec. 11, 2019

(87) PCT Pub. No.: WO2019/007713
PCT Pub. Date: Jan. 10, 2019

(65) Prior Publication Data
US 2020/0119998 A1 Apr. 16, 2020

(30) Foreign Application Priority Data
Jul. 4, 2017 (IT) .................. 102017000074597

(51) Int. Cl.
H04L 12/24 (2006.01)
G06N 20/00 (2019.01)
(Continued)

(52) U.S. Cl.
CPC ............ H04L 41/16 (2013.01); G06F 9/5077 (2013.01); G06F 16/283 (2019.01); G06N 5/04 (2013.01);
(Continued)

(58) Field of Classification Search
CPC ... H04L 41/16; H04L 67/2823; G06F 16/283; G06F 9/5077; G06N 5/04; G06N 20/00
See application file for complete search history.

(56) References Cited
U.S. PATENT DOCUMENTS

2005/0120105 A1*  6/2005  Popescu .................. H04L 41/00
                                                            709/223
2015/0263890 A1    9/2015  Fall et al.
(Continued)

OTHER PUBLICATIONS

International Search Report and Written Opinion dated Sep. 17, 2018 in PCT/EP2018/066783 filed on Jun. 22, 2018.
(Continued)

Primary Examiner — Arvin Eskandarnia
(74) Attorney, Agent, or Firm — Oblon, McClelland, Maier & Neustadt, L.L.P.

(57) ABSTRACT

A system includes a provider module to serve a Software Defined Infrastructure (SDI) service request in a first language. The system includes an NSP translation module to translate the SDI requests from the first language into a service chain including a set of Network and Service Primitives (NSP), and a service space module to map each NSP onto a multidimensional vector space using a matrix. The matrix provides positions within the multidimensional vector space of vectors corresponding to any possible NSP. The service space module queries the matrix with a sequence of vectors to retrieve a further sequence of vectors by geometric operations to find a level of similarity between the vectors and the vectors of the service space, in order to predict a new NSP according to the further sequence starting from neighbor NSPs, and predict the neighbors NSPs composing the further sequence.

10 Claims, 1 Drawing Sheet

(51) Int. Cl.
*G06F 16/28* (2019.01)
*G06F 9/50* (2006.01)
*G06N 5/04* (2006.01)
*H04L 29/08* (2006.01)

(52) U.S. Cl.
CPC ......... *G06N 20/00* (2019.01); *H04L 67/2823* (2013.01)

(56) References Cited

U.S. PATENT DOCUMENTS

| | | |
|---|---|---|
| 2015/0263982 A1 | 9/2015 | Fall et al. |
| 2016/0315827 A1 | 10/2016 | Fall et al. |
| 2016/0315828 A1 | 10/2016 | Fall et al. |
| 2016/0359764 A1 | 12/2016 | Fall et al. |
| 2017/0230477 A1* | 8/2017 | Ross ................... H04L 67/306 |
| 2018/0077077 A1 | 3/2018 | Fall et al. |
| 2018/0083885 A1 | 3/2018 | Fall et al. |

OTHER PUBLICATIONS

Syed, et al. "Proteus: A Network Service Control Platform for Service Evolution in a Mobile Software Defined Infrastructure," Mobile Computing and Networking, Oct. 3-7, 2016, NY, USA, pp. 257-270, XP058279588A, DOI: 10.1145/2973750.2973757 ISBN: 978-1-4503-4226-1.

* cited by examiner

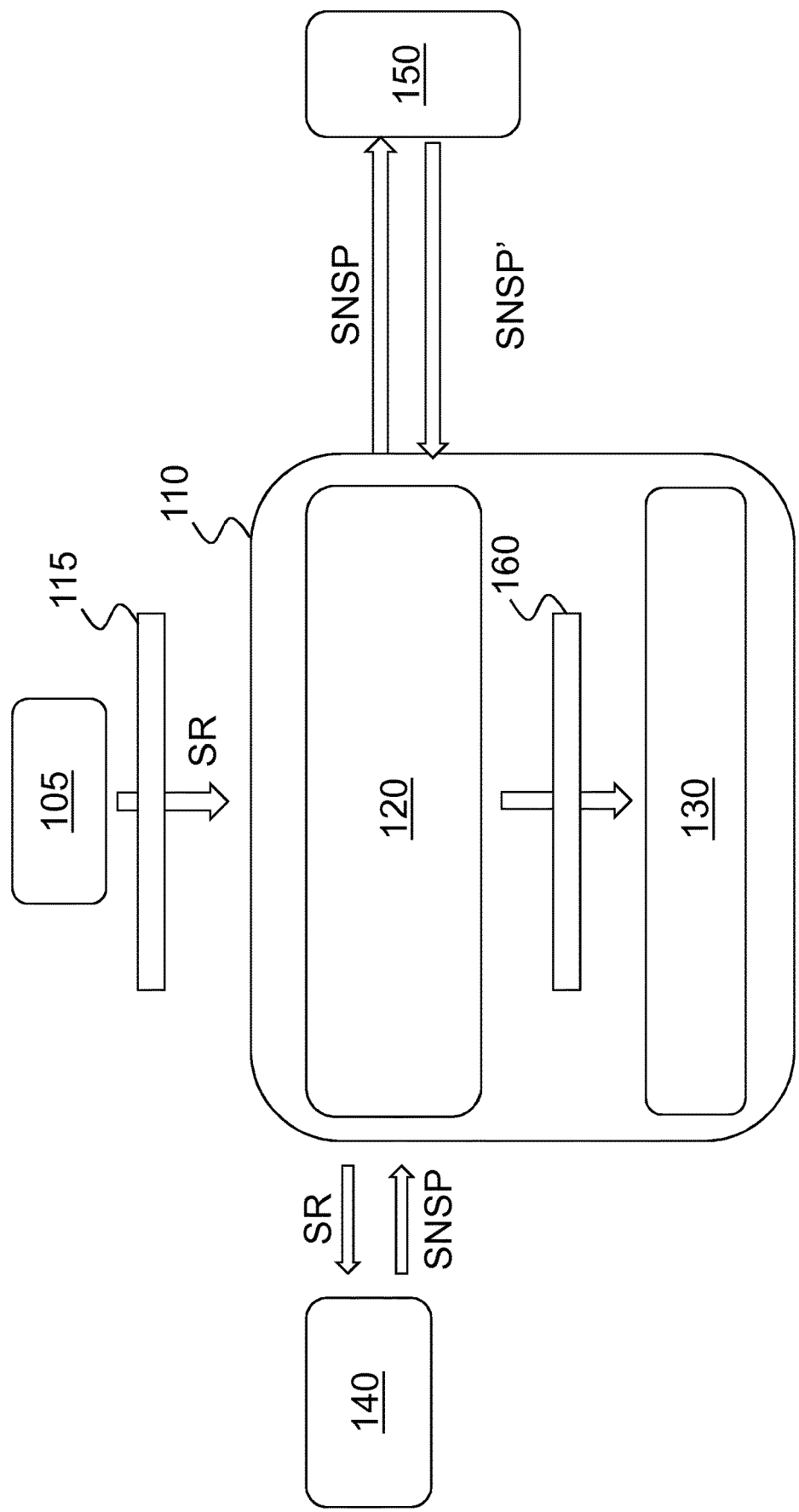

SYSTEM FOR MANAGING SERVICES IN SOFTWARE DEFINED INFRASTRUCTURES

BACKGROUND OF THE INVENTION

Field of the Invention

The present invention generally relates to the telecommunications field. More particularly, the present invention relates to a system for managing services in Software Defined Infrastructures (SDI).

Overview of the Related Art

Telecommunications infrastructures are growing in heterogeneity and complexity. Recent advances in enabling technologies such as Software Defined Networks (SDN) (see for example "Open Network Foundation, Software-Defined Networking: The New Norm for Networks, 2012" available at the filing date of the present application at the address https://www.opennetworking.org/images/stories/downloads/sdn-resources/white-papers/wp-sdn-newnorm-.pdf) and Network Function Virtualization (NFV) (see for example "ETSI Network Functions Virtualization (NFV): Architectural Framework" available at the filing date of the present application at the address http://www.etsi.org/deliver/etsi_gs/NFV/001_099/002/01.01.01_60/gs_NFV002v010l0p.pdf) are offering on one side the opportunity of decoupling the hardware and software architectures of said infrastructures and on the other side the virtualization of resources (e.g., function and services). Telecommunications infrastructures, including both network and IT resources, subjected to hardware and software decoupling (through SDN) and whose resources have been virtualized (through NFV) are called Software Defined Infrastructures (SDI). The evolution of Cloud Computing towards Edge and Fog Computing is another technology trend which is intercepting SDN and NFV in shaping SDI: in fact, virtualized network functions and services can be executed as applications on Cloud, Edge and Fog Computing resources.

SDIs are provided with management, control and orchestration systems to provide infrastructure services—characterized with specific Key Performance Indicators (KPI)—to applications and users upon specific requests. In order to provide such infrastructure services, said management, control and orchestration systems are configured to carry out several tasks, comprising for example: managing and controlling physical resources (e.g., physical nodes and IT servers, physical connections) and virtual resources (e.g., virtual machines or containers, virtual links and virtual network functions), managing the scheduling and the end-to-end orchestration of virtual network functions and other Operational Support Systems (OSS)/Business Support Systems (BSS) processes.

As already stated above, SDN and NFV technologies allow to obtain both software and hardware architectural decoupling and the virtualization of network functions and services of a SDI: examples includes from software control plane for switches and routers to middle-box functionalities such as, firewalls, network address translation, intrusion protection (see for example "IETF Middleboxes: Taxonomy and Issues" available at the filing date of the present application at the address https://www.ietf.org/rfc/rfc3234.txt). As already stated above virtualized network functions and services can be seen as applications and dynamically allocated and executed in the Cloud Computing and/or Edge Computing (e.g., in centralized Data Centre and/or in mini-Data Centre, which can be located at network Point of Presences (PoP) equipped with processing and storage capabilities). The network services of a SDI may be chained by exploiting a service (function) chaining capability. Generally speaking, chaining network services of a SDI provides for creating and provisioning a network service as a sequence or chain of interconnected network functions and services, obtained by hooking the virtual resources where they are executed through the steering of the traffic. An example of service chaining may be found at the filing date of the present application at the webpage: https://www.sdxcentral.com/sdn/network-virtualization/definitions/what-is-network-service-chaining/.

As it is known to those skilled in the art, an application (such as a SDI virtual network function or service) can be modeled as comprising a core part which contains the application logic, and one or more adapters which allow the interfacing between the application and the external world. Such adapters may for example include database access components, messaging components that produce and consume messages, or web components that either expose Application Program Interfaces (API) or implement a User Interface (UI). Instead of developing monolithic application, the microservices architectural paradigm (see for example "Microservices: Flexible Software Architecture", by E. Wolff, Addison-Wesley, 2016) proposes to split the generic application into set of smaller, interconnected services, called "microservices". Microservices are basically modular software components each of which runs a unique process which can be deployed independently, with minimal centralized management. For example some microservices can expose an API that is consumed by other microservices or by the application's clients, while other microservices can implement a web UI.

One advantage is that microservices are small components that can be developed and scaled independently. This feature allows to improve the agility of the software development and operations, promoting resilience and scalability.

Microservices can be advantageously used for modeling and developing network functions and services of a SDI, since a virtual network function or service can be decomposed in a sequence/combination of microservices and/or network primitives (see White Paper "Cloud Native NFV architecture for Agile Service Creating and Scaling", Heavy Reading, which is available at the filing date of the present application at the address https://www.mellanox.com/related-docs/whitepapers/wp-heavyreading-nfv-architecture-for-agile-service.pdf).

Generalizing, microservices can be viewed as packet processing primitives (also called network and service primitives) which can be dynamically composed to be executed in different hardware architectures. Examples of packet processing primitives may comprise: packet forwarding, packet inspection, modification (including dropping a packet), queuing, flow control and scheduling, or any other software tasks/functions, such as those required to create any Virtual Network Function (VNF), to access nodes (e.g., node address, interfaces, link status) and its storage and processing resources.

In the following, the term Network and Service Primitives (NSP) will be used to make reference to the abstractions of the abovementioned microservices and/or packet processing primitives which can be used to compose any function or service in a SDI.

By exploiting the modularity offered by NSP, the level of flexibility, programmability and resilience of a SDI can be improved. For example, as disclosed in paper "Report:

DevOps Literature Review" by Floris Erich, Chintan Amrit, Maya Daneva, University of Twente, 6 Oct. 2014 (available at the filing date of the present application at the address https://www.utwente.nl/en/bms/iebis/staff/amrit/devopsreport.pdf), by exploiting the modularity of NSP it is possible to improve the agility in software development and operations when using DevOps approaches.

SUMMARY OF THE INVENTION

The Applicant has found that even if the modularity offered by NSP is quite advantageous for the reasons explained above, the use of NSP disadvantageously increases the complexity of a SDI.

In fact, management, control and orchestration (and generally the OSS/BSS processes) of a SDI require that a very high number of NSPs have to be interconnected/hooked and operated to implement the logic of network functions and services, involving a very heavy computational burden. This drawback is further exacerbated by having the NSP which usually should be continuously updated and released.

In view of the above, the Applicant has devised a system for taking advantage of the modularity offered by NSP in managing a SDI without being affected by the abovementioned drawbacks.

An aspect of the present invention relates to a system comprising a provider module configured to serve a Software Defined Infrastructure (SDI) service request generated by a consumer. Such SDI service request is formulated in a first language.

The system further comprises an NSP translation module configured to translate such SDI requests from said first language into a corresponding service chain comprising a set of Network and Service Primitives comprising at least one NSP.

The system further comprises a service space module configured to map each NSP of a service chain onto a multidimensional vector space by exploiting a space matrix, said space matrix being a data structure providing the positions within the multidimensional vector space of vectors NSP(i) corresponding to any possible NSP.

Said service space module is also configured to query said space matrix with a sequence SNSP of vectors NSP(i) so as to retrieve a further sequence SNSP' of vectors NSP'(i) by carrying out on the vectors NSP(i) of the sequence SNSP geometric operations in order to find a level of similarity between such vectors and the vectors of the V-dimensional service space SS so as to carry out at least one among:
  predict a new NSP in the composition of the further sequence SNSP' starting from a set of neighbors NSPs composing the sequence SNSP; and
  predict a set of neighbors NSPs composing the further sequence SNSP', starting from a NSP of the sequence SNSP.

According to an embodiment of the present invention, the NSPs of the set of NSP corresponding to a generic SDI request are selected from a vocabulary set of NSPs comprising a first number of NSPs.

According to an embodiment of the present invention, each vector corresponding to a NSP is a vector having a number of elements equal to said first number, each element of the vector corresponding to a NSP of the vocabulary set of NSPs.

According to an embodiment of the present invention, each vector corresponding to a specific NSP has the element corresponding to said specific NSP sets to a first value, while the other elements of said vector are set to values different from the first value.

According to an embodiment of the present invention, each element of said other elements of said vector is set to a value indicative of a correlation degree between the specific NSP corresponding to said vector and the NSP of the vocabulary set of NSPs corresponding to such element.

According to an embodiment of the present invention, said geometric operations comprise at least one among:
  sum, and
  difference
among said vectors.

According to an embodiment of the present invention, said first language is an intent based language.

According to an embodiment of the present invention, the service space module is configured to carry out and update said mapping of each NSP of the service chain onto the multidimensional vector space by means of artificial intelligence learning methods exploiting recurrent neutral networks.

According to an embodiment of the present invention, the SDI provider module comprises a control module and a physical SDI infrastructure module, said control module being configured to manage real and virtual resources and functions of the physical SDI infrastructure module so as to accomplish the SDI service request SR according to the further sequences SNSP' generated by the service space module.

According to an embodiment of the present invention, said physical SDI infrastructure module comprises at least one among:
  networks,
  network nodes,
  IT systems,
  data centers, and
  processing and storage units.

BRIEF DESCRIPTION OF THE DRAWINGS

These and others features and advantages of the solution according to the present invention will be better understood by reading the following detailed description of an embodiment thereof, provided merely by way of non-limitative example, to be read in conjunction with the attached drawings, wherein:

FIG. 1 illustrates in terms of modules a system wherein the concepts of the present invention can be applied.

DETAILED DESCRIPTION

The embodiments of the present invention are based on the general idea of representing the NSPs, composing a network function or service answering a generic request from a SDI User, with corresponding vectors of a multidimensional space.

The generic service of a SDI may be obtained by combining NSPs selected from a set of NSPs, referred to as service vocabulary set VSET, which comprises a (e.g., very high) number V of different NSPs (e.g., V may be equal to several thousands). The NSPs of the service vocabulary set VSET can be used as "words" which can be selected and combined together, such as for example through an intent-based language, for expressing any generic service of a SDI.

According to an embodiment of the present invention, the generic i-th NSP of the service vocabulary set VSET can be represented on a V-dimensional vector space, referred to as service space SS, by means of a corresponding V-dimensional vector NSP(i)=[a(i)(1), a(i)(2), . . . , a(i)(j), . . . , a(i)(V)] comprising V vector elements a(i)(j) (j=1 to V). In other words, according to an embodiment of the present invention, a relationship is established between each i-th NSP of the service vocabulary set VSET and a corresponding V-dimensional vector NSP(i). The V-dimensional vector NSP(i) is therefore a geometric representation of the i-th NSP of the service vocabulary set VSET within the service space SS.

According to an embodiment of the present invention, each generic i-th NSP of the service vocabulary set VSET can be transformed, based on the so-called "one-hot" encoding, in a vector NSP(i) whose only vector element a(i)(j) different than 0 is the i-th one a(i)(j=i). Naturally, similar considerations apply if a different convention is used, such as for example with the vector elements a(i)(j) of the i-th vector NSP(i) that are equal to 1 for j≠i, and equal to 0 for j=i. According to this solution, each NSP of the service vocabulary set VSET is represented by a corresponding vector NSP(i) which can be seen as a single point in the service space SS.

According to another embodiment of the present invention, instead of using the "one-hot" encoding, it is possible to set the generic vector element a(i)(j) of the i-th vector NSP(i) which identifies the i-th NSP of the service vocabulary set VSET—to a value which quantifies a correlation degree between the i-th NSP itself and the j-th NSP of the service vocabulary set VSET. The highest value occurs for the vector element a(i)(j=i) for which j=i, since such vector element a(i)(j=i) represents the correlation of the i-th NSP with itself. In this context, two NSPs are considered be correlated to each other if they appear together to form a same SDI service (service chain).

Compared to vectors obtained with the "one-hot" encoding, vectors obtained with the solution described above provide additional semantic information about how the various NSPs of the service vocabulary set VSET are correlated to each other. In fact, according to this solution, correlation among NSPs is geometrically expressed by comparing the positions—i.e., the coordinate values given by the vector elements a(i)(j)—of the corresponding vectors NSP (i) within the service space SS. In this way, given for example three different NSPs, identified by the three different vectors NSP(i) (i=i', i'', i'''), if the NSP corresponding to the vector NSP(i) has a higher correlation with the NSP corresponding to the vector NSP(i'') compared to the correlation it has with the NSP corresponding to the vector NSP(i'''), the distance—within the service space SS—between vector NSP(i) and vector NSP(i'') is lower than the distance between vector NSP(i) and vector NSP(i''').

In order to show a conceptual example of how the representation according to said embodiment of the invention may be used to reflect correlations among NSPs, reference is now made to a very simplified case in which it is supposed that the NSPs are represented by English words referring to countries and capitals (instead, the NSPs are software code portions which are abstractions of microservices and/or packet processing primitives of a service/function in a SDI).

According to this example, the service vocabulary set VSET comprises the following V=8 different NSPs each one identified by a corresponding vector NSP(i) (i=1 to V=8) belonging to a 8-dimensional service space SS:
"ROME", identified by vector NSP(1),
"PARIS", identified by vector NSP(2),
"BERLIN", identified by vector NSP(3),
"LONDON", identified by vector NSP(4),
"ITALY", identified by vector NSP(5),
"FRANCE", identified by vector NSP(6),
"GERMANY", identified by vector NSP(7),
"UNITED KINGDOM", identified by vector NSP(8).

A possible mapping of such eight exemplary NSPs onto the 8-dimensional service space SS may provide for the following vectors NSP(i):
NSP(1)=[1,0,0,0,0.5,0,0,0]
NSP(2)=[0,1,0,0,0,0.5,0,0]
NSP(3)=[0,0,1,0,0,0,0.5,0]
NSP(4)=[0,0,0,1,0,0,0,0.5]
NSP(5)=[0.5,0,0,0,1,0,0,0]
NSP(6)=[0,0.5,0,0,0,1,0,0]
NSP(7)=[0,0,0.5,0,0,0,1,0]
NSP(8)=[0,0,0,0.5,0,0,0,1].

For each vector NSP(i), the vector element a(i)(j) having the highest value (e.g., 1) is the one identifying the NSP itself, i.e., the one for which index j is equal to index i. If a vector element a(i)(j) at the j-th position, with i≠j, has a value higher than 0 (e.g., 0.5), it means that the NSP identified by the vector NSP(i) has at least some (i.e., higher than zero) degree of correlation with the NSP identified by the vector NSP(j). The higher the value of such vector element a(i)(j) at the j-th position, the higher the degree of correlation between the NSP identified by the vector NSP(i) and the NSP identified by the vector NSP(j).

Making reference to the exemplary vector NSP(1) identifying the NSP "ROME", it can be seen that the first vector element a(i=1)(j=1) is equal to 1, the fifth vector element a(i=1)(j=5) is equal to 0.5, and the other vector elements a(i=1)(j) (j=2, 3, 4, 6, 7, 8) are equal to 0. This means that the NSP "ROME" is identified by the vector NSP(1), has at least some (i.e., higher than zero) degree of correlation with the NSP "ITALY" identified by the vector NSP(5), and does not possess any degree of correlation with the other NSPs. From a geometric point of view, this correlation can be seen by observing that the vector which is the closest one to NSP(1) is vector NSP(5).

Similarly, it can be observed the vector which is the closest one to NSP(2) ("PARIS") is vector NSP(6) ("FRANCE"), the vector which is the closest one to NSP(3) ("BERLIN") is vector NSP(7) ("GERMANY"), and so on.

As will be described in greater details in the following of the present description, service requests SR directed to a SDI provider may be formulated in terms of a high-level language (e.g., an intent-based language) which cannot be directly understood by the management control and orchestration system of the SDI itself. For this purpose, a translation from such high-level language to a sequence (chain) of NSPs which can be understood by the management control and orchestration system of the SDI should be required. For example, according to solutions known in the art, such translation can be carried out through proper lookup tables (see for example document "Intent NBI—Definition and Principles", Open Network Fundation, October 2016 ONF TR-523, which is available at the filing date of the present application at the address https://www.opennetworking.org/imagees/stories/downloads/sdn-resources/technical-re orts/TR-523_Intent_Definition_Principles.pdf).

According to an embodiment of the present invention, the sequence of NSPs resulting from such translation is mapped onto the service space SS and is processed so as to obtain an optimized sequence of NSPs, and the management control and orchestration system of the SDI is configured to manage the real and virtual resources and functions of the SDI so as to accomplish the SDI service request SR according to said optimized sequence of NSPs.

According to an embodiment of the present invention, the mapping of the NSPs onto the service space SS is carried out (and periodically updated) through Artificial Intelligence (A.I.) learning methods, for example by exploiting recurrent neural networks that can be trained through sets of thousands of services context (existing compositions of NSP). In this case, vectors NSP(i) composing a service context can be given as inputs to a recurrent neural network that treats each NSP as a word by exploiting at least one between the continuous bag-of-words approach or the continuous skip-gram approach in order to predict a certain service context (i.e., a certain SDI service) given a NSP and/or vice-versa a NSP given a certain service context.

Once the recurrent neural network is trained to some level of accuracy, a so-called space matrix SM of the trained neural network is obtained, designed to map (this operation can be also referred to as projection) any vectors NSP(i) onto the service space SS. In other words, the space matrix SM is a data structure showing the positions (coordinates) within the V-dimensional service space SS of the vectors NSP(i) corresponding to any possible NSP. The space matrix SM can be queried to find relationships between vectors NSP(i), or the level of similarity between them.

It should be noted that vectors NSP(i) corresponding to NSPs pertaining to similar SDI service requests SR tend to cluster in the service space SS, i.e., the NSPs tend to be mapped into vectors NSP(i) which are close to each other in the service space SS. This feature is very similar to the clustering of words with similar meanings which occurs in the known word embedding procedures.

Learning methods according to the present invention can be implemented using any word embedding models based on a feed-forward neural network that takes words from a vocabulary as input and embeds them as vectors into a lower dimensional space. The feed-forward neural network then fine-tunes through back-propagation, and necessarily yields word embeddings as the weights of a first layer, which is usually referred to as Embedding Layer. A recent example is represented by word2vector (see "Distributed Representations of Words and Phrases and their Compositionality" by Tomas Mikolov, Ilya Sutskever, Kai Chen, Greg Corrado, Jeffrey Dean, available at the filing date of the present application at the address https://papers.nips.cc/paper/5021-distributed-representations-of-words-and-phrases-and-their-compositionality.pdf) which is arguably the most popular of the word embedding models.

According to an another embodiment of the present invention, a vectorial representation of a whole service of a SDI—i.e., a sequence or set (chain) of NSPs instead of a single NSP may be provided. Such service may be represented by a corresponding service vector S(k) of several elements, each of which is capturing the relationships with other SDI services. So, each service of a SDI is represented by a distribution of weights across those elements of the vector S(k). Said vectors S(k) can be seen as single points in a high dimensional service space.

As already described for the vectors NSP(i), this high dimensional service space can be created and continuously updated by using Artificial Intelligence (A.I.) learning methods (e.g., recurrent neural networks). Indeed, it is possible to represent an entire thought or sentence, including actions, verbs, subjects, adjectives, adverbs etc., as a single point referred to as thought vector—in a high dimensional space. Then if thought vector structure of human language encodes the key primitives (grammar and semantic meaning) used in human intelligence, then services vectors could encode the key primitives (NSPs) used by "applications intelligence". Moreover, thought vectors have been observed empirically to possess some properties, such as for example the "Linear Structure" property, according to which certain directions in thought-space can be given semantic meaning, and consequently the whole thought vector is a geometrical sum of a set of directions or primitives. In the same way, certain directions in the service space can be given a context meaning, and consequently a service vector S(k) can be seen as a geometrical sum of a set of directions or primitive.

FIG. 1 illustrates in terms of modules a system wherein the concepts of the present invention can be applied.

It should be noted that the terms 'system' or 'module' are herein intended to comprise, but not limited to, hardware, firmware, a combination of hardware and software, software.

For example, a system or module may be, but is not limited to being, a process running on a processor, a processor, an object, an executable, a thread of execution, a program, and/or a computing device.

In other words, a system or module may comprise an application being executed on a computing device and/or the computing device itself.

One or more systems or modules may be localized on one computing device and/or distributed between two or more computing devices.

Systems or modules may comprise and/or interact with computer readable media having storing data according to various data structures.

The systems or modules may communicate by exploiting local and/or remote processes, preferably by means of electrical, electromagnetic and/or optical signals providing one or more data packets, such as data packets from one system or module interacting with another system or module in a local system, in a distributed system, and/or across a radio network and/or a wired network.

Reference 105 identifies a consumer which is requesting SDI services to a SDI provider 110 through an Intent North Bound Interface (Intent NBI) 115.

It should be noted that the term consumer does not necessarily/specifically imply a user/customer, nor does it, generally, imply a human entity. This term is used in the broad sense of an entity which is consumer of the services offered by the SDI provider 110. The Intent NBI is a declarative paradigm/methodology for interaction between the consumer 115 and the SDI provider 110.

The SDI provider 110 is a provider which owns a SDI through which serves service requests SR generated by the consumer 105.

The SDI provider 110 comprises a management, control and orchestration system module 120 and a physical SDI infrastructure module 130 (such as for example comprising networks, nodes, data centers, IT systems, processing and storage units) provided with real and virtual resources and functions (such as for example processing, storage and networking).

Open Networking Foundation (ONF) is providing definition and principles of an Intent NBI (see Intent NBI Definition and Principles October 2016—ONF TR-523 available at the filing date of the present application at the address https://www.opennetworking.org/images/stories/downloads/sdn-resources/technical-ports/TR-523_Intent_Definition_Principles.pdf). Internet Engineering Task Force (IETF) has adopted the NEMO specifications for Intent NBI (see S. Hares, "Intent-Based Nemo Overview", Internet Draft, RFC, October 2015, available at the filing date of the present application at the address https://tools.ietf.org/pdf/draft-hares-ibnemo-overview-01.pdf and "NEtwork MOdeling (NEMO) Language An Application API for Intent Driven Networking: Technical Reference Manual" Version 0.7 available at the filing date of the present application at the address http://nemo-project.net/NEMO-version-0.7.pdf) as an Intent-based networking language.

In general, the Intent NBI 115 simplifies SDI service requests SR interactions between consumer 105 and SDI provider 110. This is achieved by permitting consumer 105 to generate SDI service requests SR using terms that are intrinsically known and relevant to the consumer 105 itself.

The management, control and orchestration system 120 is configured to forward the SDI service request SR—formulated according to an intent based language—received from the consumer 105 to a NSP translation module 140 (e.g., comprising proper look-up tables) configured to translate the terms included in the SDI service request SR from the intent based language to a sequence or set (service chain) of NSPs SNSP (comprising at least one NSP) necessary to provide the service requested by the consumer 105. Such translation works as an information intermediation mechanism that allows consumer 105 and SDI provider 110 to communicate using terms which are "natural" to both of them.

Instead of directly process the sequence SNSP to configure and control the operation of the (resources of the) physical SDI infrastructure module 130, according to an embodiment of the present invention, the management, control and orchestration system 120 interacts with a service space module 150 implementing the abovementioned space matrix SM showing the positions (coordinates) within the V-dimensional service space SS of the vectors NSP(i) corresponding to any possible NSP.

According to an embodiment of the present invention, the space matrix SM is queried with the sequence SNSP (whose NPSs have been transformed in a corresponding vector by an embedding module 170 according to the solutions described above) to retrieve from the service space SS a further sequence SNSP' optimized with respect to the sequence SNSP. To this purpose, by exploiting predictions implemented by the space matrix SM in the same way as word2vector is capable of doing for Natural Language Processing systems, the service space module 150 is able to carry out on the vectors NSP(i) of the sequence SNSP geometric operations in order to find relationships and/or a level of similarity between such vectors and the vectors of the V-dimensional service space SS. In this way, the service space module 150 can predict a new NSP in the composition of the further sequence SNSP' starting from a set of neighbours NSPs composing the sequence SNSP and/or predict a set of neighbours NSPs composing the further sequence SNSP', starting from a NSP of the sequence SNSP. These operations are carried out based on the assumption that as similar words are "close" to each other in a words vector space, analogously, vectors NSP(i) of similar, correlated NSPs are close to each other in the service space SS.

Making reference to the abovementioned exemplary case in which the NSPs, instead of being abstractions of microservices and/or packet processing primitives of a service/function in a SDI, are represented by English words referring to countries and capitals, the vector NSP(1) corresponding to "ROME", the vector NSP(2) corresponding to "PARIS", the vector NSP(3) corresponding to "BERLIN" and the vector NSP(4) corresponding to "LONDON" are close to each other and cluster in a same region of the service space SS since each one of them corresponds to a capital. Moreover, each vector NSP(1), NSP(2), NSP(3), NSP(4) corresponding to a capital has a same distance (within the service space SS) with respect to the vector corresponding to the respective state for which it is the capital. For example, the distance between the vector NSP (1) corresponding to "ROME" and the vector NSP(5) corresponding to "ITALY" (e.g., NSP(1) NSP(5)) will be equal to the distance between the vector NSP(2) corresponding to "PARIS" and the vector NSP(6) corresponding to "FRANCE" (e.g., NSP(2) NSP(6)). Then, if the system only knew that "ROME" (corresponding to vector NSP(1)) is the capital of "ITALY" (corresponding to vector NSP(5)), and wanted to know which is the capital of "FRANCE" (corresponding to vector NSP(6)), it would be sufficient to carry out the vector operation NSP(1) NSP(5)+NSP(6), whose result is the vector NSP(2), corresponding to "PARIS" (e.g., the capital of France).

In an analogous way, making reference to a real scenario, in which NSPs are abstractions of microservices and/or packet processing primitives of a service/function in a SDI, vectors NSP(i) corresponding to similar, correlated NSPs are close to each other and cluster in a same region of the service space SS, and have similar distances (within the service space SS) with respect to other vectors NSP(i) corresponding to NSPs with which they have possible logical relationships, such as for example which are part of same service chains.

As an example, to accomplish a SDI service request SR which concerns service awareness and relates to parental control and anti-virus for Internet traffic sessions; an SDI should implement a NSP Deep Packet Inspection (DPI) to look into the flows of the internet packets sessions. It should be noted that, when a DPI function is part of a service chain, packets processed by the DPI function, according to their content, may be directed to different paths. In particular, if said packets can potentially have an unsafe content, the traffic generated by them first goes through a firewall and then arrives to an anti-virus function. According to the present invention, "DPI", "anti-virus control" and "parental control" are NSPs that in the service space SS are mapped on vectors NSP(i) which are close to each other and have a certain level of correlation as they are present in service chains addressing content awareness.

According to an embodiment of the present invention, the management control and orchestration system 120 of the SDI is then configured to manage, through a proper interface, referred to as South Bound Interface (SBI) 160, the real and virtual resources and functions of the physical SDI infrastructure module 130 so as to accomplish the SDI service request SR according to the further sequences SNSP' generated by the service space module 150.

Naturally, in order to satisfy local and specific requirements, a person skilled in the art may apply to the solution described above many logical and/or physical modifications and alterations. More specifically, although the present invention has been described with a certain degree of particularity with reference to preferred embodiments thereof, it should be understood that various omissions, substitutions and changes in the form and details as well as other embodiments are possible. In particular, different embodiments of the invention may even be practiced without the specific details set forth in the preceding description for providing a more thorough understanding thereof; on the contrary, well-known features may have been omitted or simplified in order not to encumber the description with unnecessary details. Moreover, it is expressly intended that specific elements and/or method steps described in connection with any disclosed embodiment of the invention may be incorporated in any other embodiment.

The invention claimed is:

1. A system comprising:
a provider module configured to serve a Software Defined Infrastructure (SDI) service request generated by a consumer, such SDI service request being formulated in a first language;
an NSP translation module configured to translate such SDI requests from said first language into a corresponding service chain comprising a set of Network and Service Primitives (NSP) comprising at least one NSP;
a service space module configured to map each NSP of a service chain onto a multidimensional vector space by exploiting a space matrix, said space matrix being a data structure providing the positions within the multidimensional vector space of vectors NSP(i) corresponding to any possible NSP; and wherein
said service space module is also configured to query said space matrix with a sequence SNSP of vectors NSP(i) so as to retrieve a further sequence SNSP' of vectors NSP'(i) by carrying out on the vectors NSP(i) of the sequence SNSP geometric operations in order to find a level of similarity between such vectors and the vectors of the V-dimensional service space SS so as to carry out at least one among:
predict a new NSP in the composition of the further sequence SNSP' starting from a set of neighbors NSPs composing the sequence SNSP; and
predict a set of neighbors NSPs composing the further sequence SNSP', starting from a NSP of the sequence SNSP.

2. The system of claim 1, wherein the NSPs of the set of NSP corresponding to a generic SDI request are selected from a vocabulary set of NSPs comprising a first number of NSPs.

3. The system of claim 2, wherein each vector corresponding to a NSP is a vector having a number of elements equal to said first number, each element of the vector corresponding to a NSP of the vocabulary set of NSPs.

4. The system of claim 3, wherein each vector corresponding to a specific NSP has the element corresponding to said specific NSP sets to a first value, while the other elements of said vector are set to values different from the first value.

5. The system of claim 4, wherein each element of said other elements of said vector is set to a value indicative of a correlation degree between the specific NSP corresponding to said vector and the NSP of the vocabulary set of NSPs corresponding to such element.

6. The system of claim 1, wherein said geometric operations comprise at least one among:
sum, and
difference
among said vectors.

7. The system of claim 1, wherein said first language is an intent based language.

8. The system of claim 1, wherein the service space module is configured to carry out and update said mapping of each NSP of the service chain onto the multidimensional vector space by means of artificial intelligence learning methods exploiting recurrent neutral networks.

9. The system of claim 1, wherein the SDI provider module comprises a control module and a physical SDI infrastructure module, said control module being configured to manage real and virtual resources and functions of the physical SDI infrastructure module so as to accomplish the SDI service request SR according to the further sequences SNSP' generated by the service space module.

10. The system of claim 1, wherein said physical SDI infrastructure module comprises at least one among:
networks,
network nodes,
IT systems,
data centers, and
processing and storage units.

* * * * *